C. F. BROWN.
LIQUID DISPENSING AND MEASURING APPARATUS.
APPLICATION FILED JAN. 11, 1913.
1,170,872.
Patented Feb. 8, 1916.
4 SHEETS—SHEET 2.
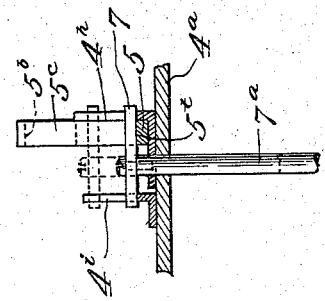
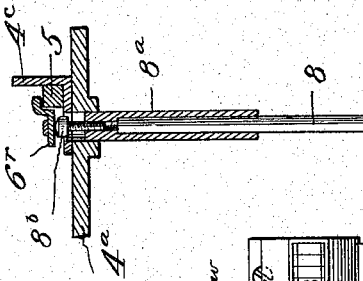
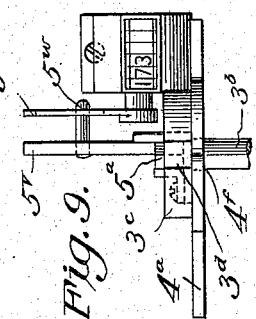
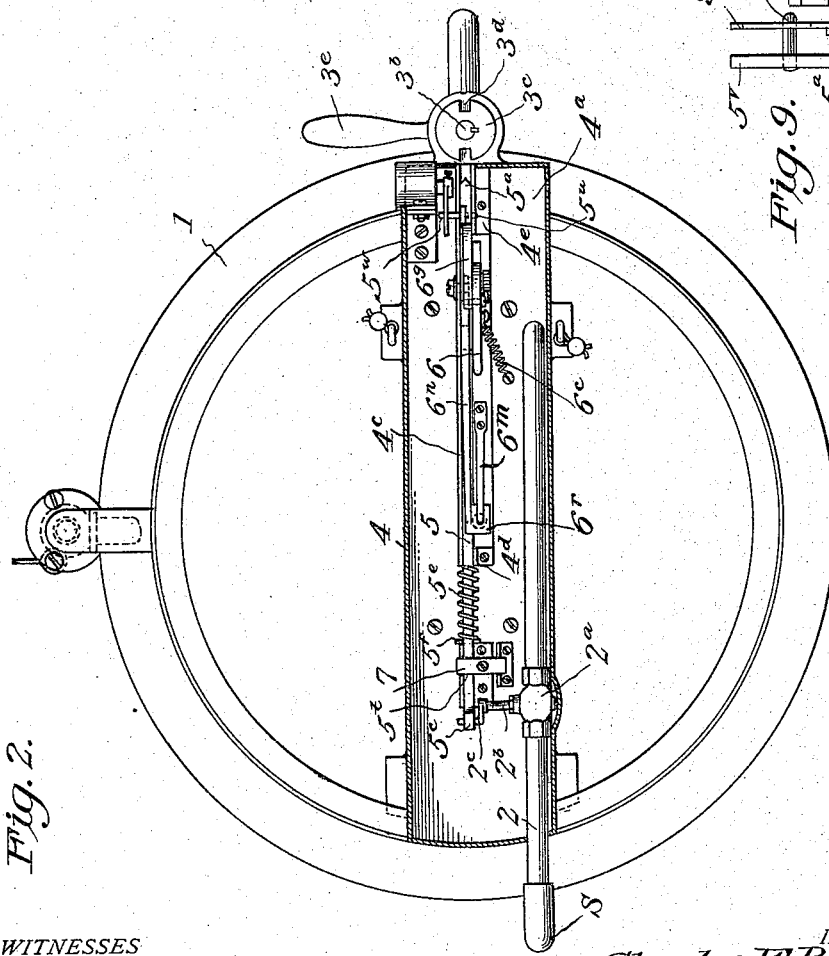
WITNESSES
INVENTOR
Charles F. Brown
Attorney

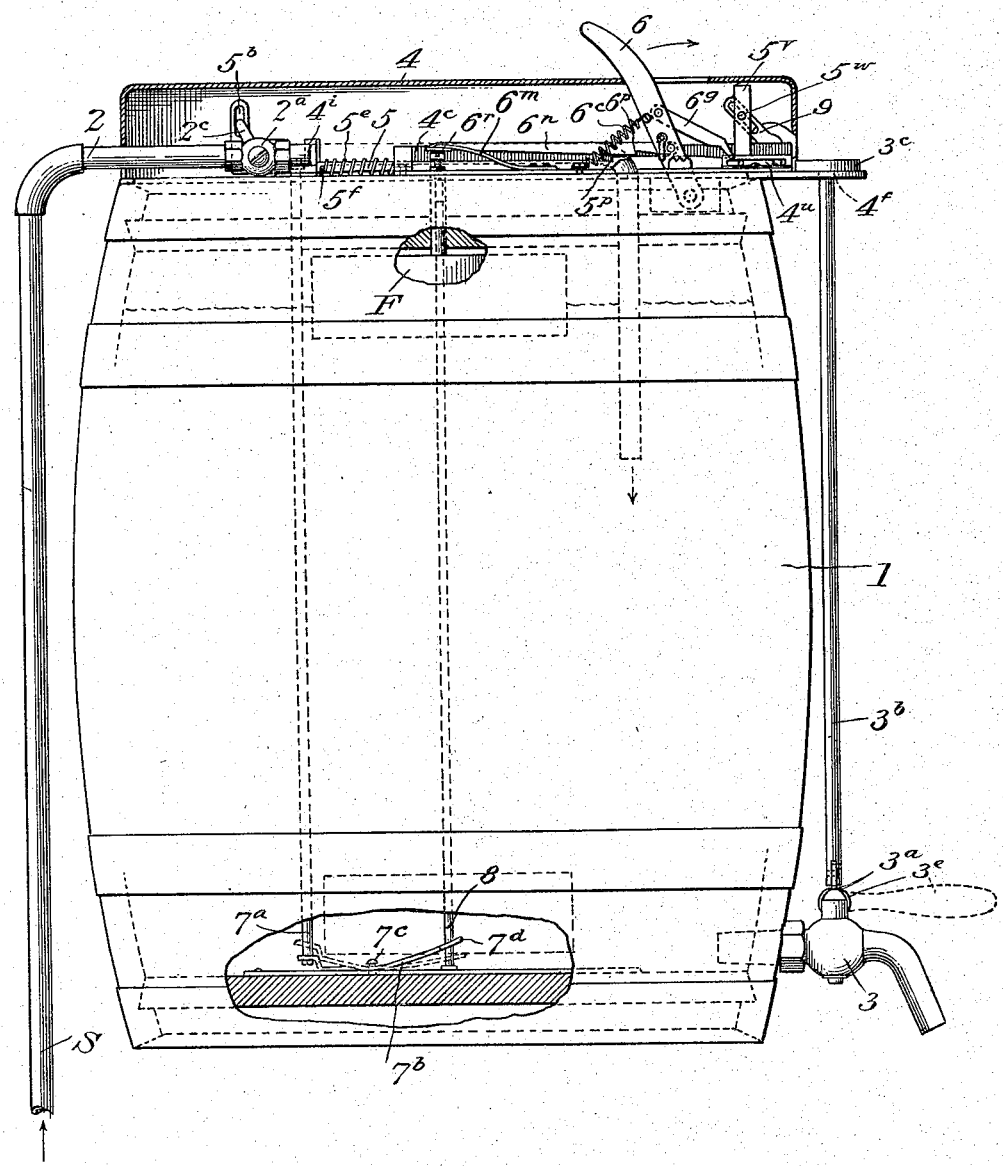

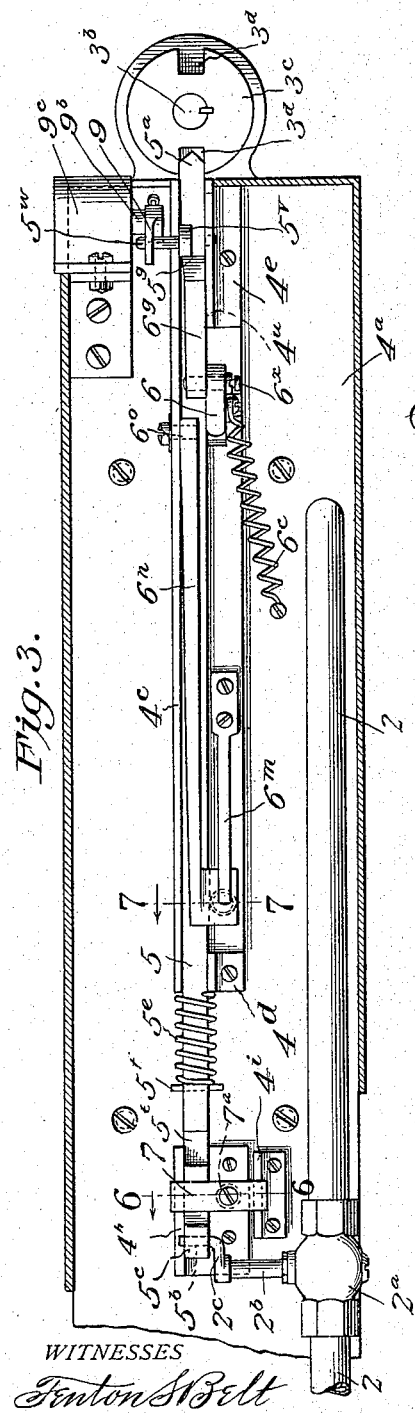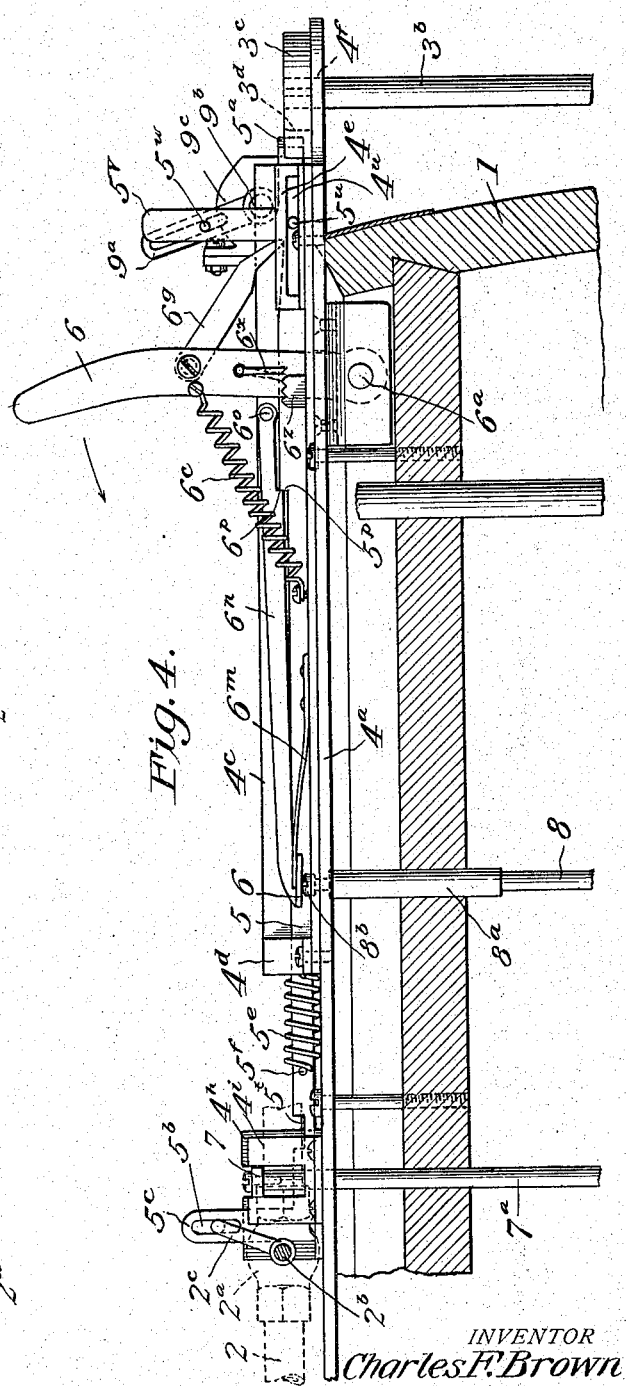

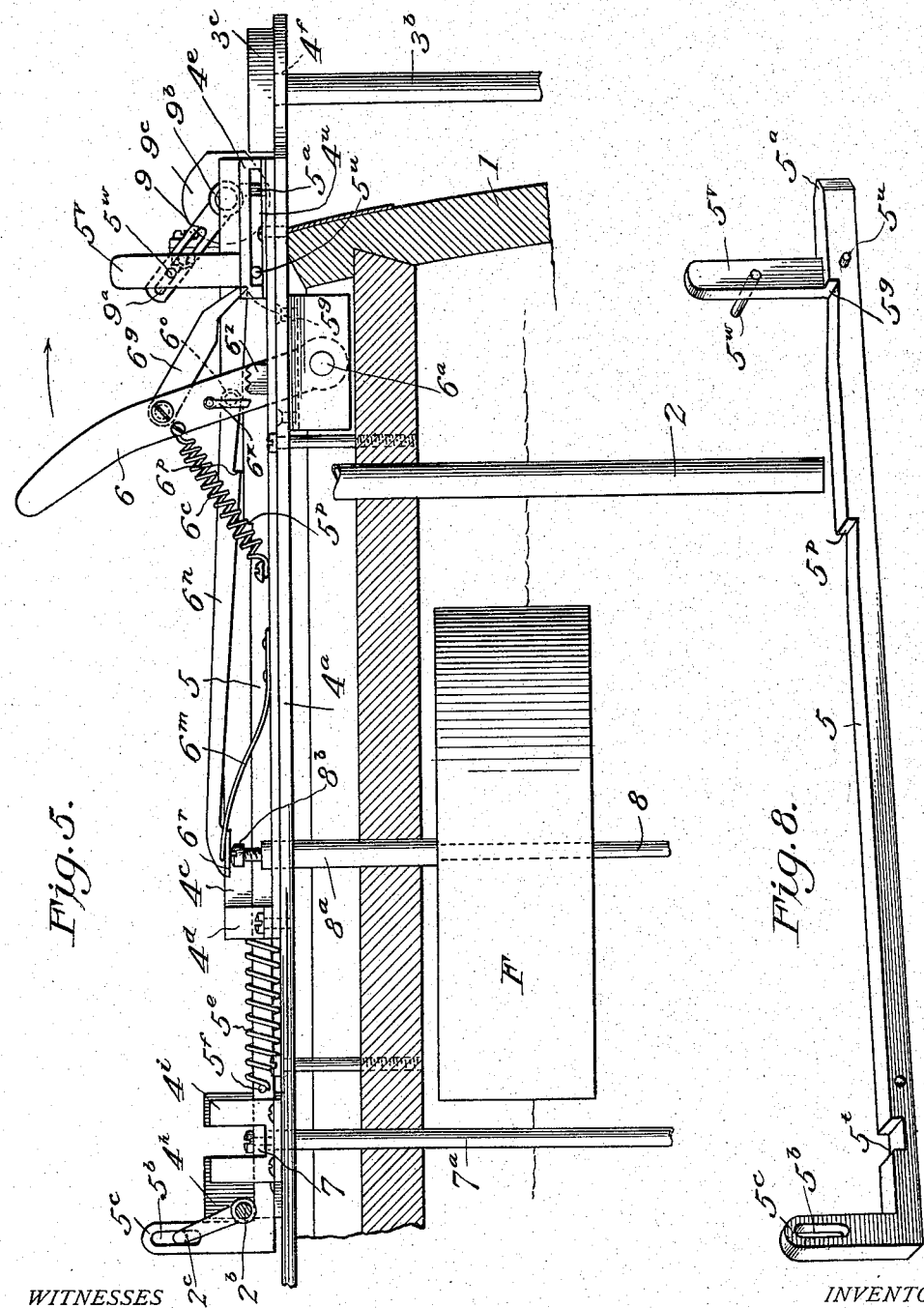

UNITED STATES PATENT OFFICE.

CHARLES F. BROWN, OF NEW YORK, N. Y., ASSIGNOR, BY MESNE ASSIGNMENTS, OF ONE-HALF TO ARTHUR D. DICKERSON, OF FREEHOLD, NEW JERSEY.

LIQUID DISPENSING AND MEASURING APPARATUS.

1,170,872.          Specification of Letters Patent.        Patented Feb. 8, 1916.

Application filed January 11, 1913. Serial No. 741,476.

*To all whom it may concern:*

Be it known that I, CHARLES F. BROWN, of New York, in the county of New York and State of New York, have invented certain new and useful Improvements in Liquid Dispensing and Measuring Apparatus.

This invention is a novel improvement in apparatus particularly designed for use by retailers in measuring and dispensing fluids and liquids from original containers; and its object is to provide means whereby the amount of liquid withdrawn from a container or other supply and dispensed will be accurately measured and registered so that it will be practically impossible for dishonest persons to surreptitiously withdraw liquid from the apparatus without the amount so withdrawn being registered. The apparatus is also particularly useful in dispensing liquid beverages which are ordinarily sold in barrels or casks to the retailer, and in this connection the invention provides novel apparatus which can be connected with the original cask or container and which when so connected will enable its contents to be withdrawn as desired for retail purposes and accurately measured and the amount of liquid withdrawn from the original package, cask or barrel will be registered, thereby enabling the retailer to ascertain the actual amount of liquid delivered to him in the original container when the same has been finally emptied through or into the dispensing apparatus.

The invention provides a measuring vessel, capable of holding an exact predetermined amount of liquid, and adapted to be connected by suitable piping with the supply of liquid to be dispensed or measured, or with the liquid container whose contents are to be measured. This vessel is provided with an inlet or supply valve controlling the admission of liquid into said vessel from said container, or other supply; and said vessel is also provided with a dispensing or outlet valve, or faucet, and with mechanism operated or controlled by a float within said vessel, whereby when the vessel is once filled with the exact quantity of liquid it is intended to hold, the supply valve will be automatically closed and locked; and the delivery faucet will be unlocked and can be opened and remain open until the vessel is emptied. And when the vessel is emptied and the outlet valve closed, the latter will be locked before and when the supply valve is opened and the supply valve will be held locked until the vessel has been refilled and the supply valve again closed and locked. In brief the outlet valve must be closed and be locked in closed position before and while the supply valve is open; and the supply valve must be closed and will be locked in closed position before and when the outlet valve is opened; so that when the vessel is once filled no further liquid can be admitted thereinto until it has been wholly emptied; and it will be impossible for a dishonest person to run liquid through the vessel by simultaneously opening both valves. The vessel is furthermore provided with registering mechanism which is suitably operated by the valve controlling devices so that each time the vessel is filled the amount of liquid admitted thereinto will be registered. The vessel may also be provided with a visual indicating gage to show the amount of liquid in the vessel at any time.

I will describe the present invention in detail with reference to the accompanying drawings which illustrate same, and in the claims summarize the novel features and combinations of parts for which protection is desired.

In said drawings—Figure 1 is a side elevation of a vessel equipped with valves and controlling and registering devices embodying the invention, portions being broken away to show interior parts more clearly. Fig. 2 is a top plan view of Fig. 1 with the casing broken away, the parts being shown in the positions assumed when the outlet valve is unlocked. Fig. 3 is an enlarged plan view of the controlling device as shown in Fig. 2 with the parts in positions assumed when the outlet valve is locked and the inlet valve is unlocked. Fig. 4 is a side elevation of the parts shown in Fig. 3. Fig. 5 is a view similar to Fig. 4 showing the parts in positions assumed when the inlet valve is locked and the outlet valve is unlocked. Fig. 6 is a section on line 6—6 Fig. 3. Fig. 7 is a section on line 7—7 Fig. 3. Fig. 8 is a detail view of the valve controlling bar detached. Fig. 9 is a detail front view showing the registering devices more clearly.

The measuring vessel 1 may be of any suitable construction, being shown as a keg or cask in the drawings, and is adapted to contain a predetermined amount of liquid, for instance one gallon. Liquid may be admitted into this vessel through a pipe 2, which preferably enters the top of the vessel as indicated in the drawings, and is provided with a supply valve $2^a$ hereinafter referred to. The pipe 2 is adapted to be connected with a pipe S leading to a liquid supply, or to the container of the liquid to be passed through the measuring vessel. The vessel is also provided with an outlet valve or faucet 3 near its lower end, said valve 3 being provided with a handle $3^e$ by which it can be opened and closed manually. The said inlet and outlet valves are controlled by devices hereinafter explained, so that when one valve can be or is opened the other will be locked.

The valve $2^a$ is preferably arranged within a metallic casing 4 fixedly attached to the top of the vessel as shown. The base plate $4^a$ of said casing projects beyond the edge of the vessel and directly above the valve 3, and is provided with a bearing $4^f$ in which is journaled the upper end of a rod $3^b$ attached to the stem $3^a$ of the outlet valve 3. To the rod $3^b$ above plate $4^a$ is secured a disk $3^c$ which is provided with diametrically opposite notches $3^d$, one of which, when the valve is closed, will be in position to be engaged by the end $5^a$ of a slidable valve controlling and locking bar 5, which is supported upon the base plate $4^a$ and is guided longitudinally between suitable flanges or guide plates $4^c$, $4^d$, $4^e$, attached to the base plate $4^a$, see Figs. 3, 4 and 5. On the stem $2^b$ of the inlet valve $2^a$ is an arm $2^c$ the upper end of which may be bent at right angles and engaged with a slot $5^b$ in an upstanding finger $5^c$ on the adjacent end of the bar 5, so that the valve $2^a$ may be opened or closed by sliding bar 5 longitudinally. The bar 5 is normally held in the position shown in Figs. 1 and 5 with the inlet valve closed and the outlet valve free by means of a suitable spring, a helical expansion spring $5^e$ being shown strung on the bar 5 between the guides $4^d$, $4^e$, and a collar or pin $5^f$ on the bar 5. The bar 5 may be moved in the opposite direction (or projected) so as to open the inlet valve $2^a$ and lock the outlet valve 3 in closed position, by means of a hand lever 6 pivoted to the base plate $4^a$ as shown at $6^a$. This lever is normally held in retracted position, as shown in Fig. 1, by means of a spring as $6^c$ attached to the lever and to a suitable fixed part on the casing. To this lever 6 is pivoted a pawl $6^g$ which rests upon the upper side of bar 5 and is adapted to engage a notch $5^g$ in the bar 5 when the lever 6 is pulled forward, against the resistance of the spring $6^c$, in the direction indicated by the arrows in Figs. 1 and 5. The lever 6 however cannot be pulled forward until and unless one of the notches $3^d$ in the disk $3^c$ on the valve rod $3^b$ be in register with the end $5^a$ of the bar 5; but when either notch $3^d$ is in such position, the lever 6 can be pulled outward, thereby causing pawl $6^g$ to engage notch $5^g$ and move bar 5 outward, and also tensioning spring $5^e$; and before valve $2^a$ is opened the outer end $5^a$ of bar 5 will enter one of the notches $3^d$ in disk $3^c$, (see Figs. 3 and 4), thereby locking the outlet valve in closed position, and the outward movement of the bar 5 (by reason of the engagement of finger $5^c$ with the valve lever $2^c$) opens the inlet valve $2^a$ just after the outlet valve is locked.

Suitable devices should be provided for insuring the complete movement of bar 5 in either direction to prevent persons tampering with the apparatus and reciprocating such bar repeatedly before the vessel is properly filled. Any suitable devices may be used either on the lever 6 or on the bar 5 to insure that it must make a complete stroke in both directions. As shown in Figs. 1, 4 and 5, a small pawl $6^x$ is pivotally attached to the side of the lever 6 and is adapted to engage and ride over a serrated plate $6^z$ attached to the base plate at the side of said lever, so that when the lever 6 is pulled forward said pawl will engage said notched plate and prevent the lever being retracted until it and bar 5 have been moved completely forward; said pawl $6^x$ will also engage the part $6^z$ when the lever swings backward and prevent said lever being again pulled forward until after it and bar 5 have made their complete return strokes.

When the bar 5 is projected into engagement with the disk $3^c$ so as to open the valve $2^a$ as described, it is locked in this position by means of a detent lever $6^n$, which is pivoted to a fixed part of the frame, and preferably to the guide plate $4^c$, as indicated at $6^o$, just above the top of the bar 5. This detent $6^n$ has a tooth $6^p$ which is adapted to engage with an opposed tooth or notch $5^p$ in the bar 5, when the latter is projected as described, as shown in Figs. 3 and 4, thereby locking the bar 5 in such projected position, so that it cannot return with the lever 6. The detent $6^n$ is depressed by spring $6^m$ and has a laterally projecting finger $6^r$ which lies above and is adapted to be engaged by the upper end of a tubular member $8^a$ slidably mounted on the upper end of a rod 8 in the vessel as shown, and such tubular member $8^a$ may be provided with an adjusting screw $8^b$ in its upper end to regulate the point or time of contact with the finger $6^r$. The rod 8 is secured to the bottom of the vessel and is adapted to guide a float F which is placed within the vessel and is capable of vertical movement therein, and floats on the liquid in the vessel. When the vessel is properly filled the float will raise member $8^a$ (see Figs. 1 and 5) and thereby disengage detent $6^n$ from the bar 5, which will thereupon be retracted by spring $5^e$ and close the inlet valve and unlock the outlet valve. When the bar 5 is thus retracted it is held in such position by means of a catch plate 7, which normally lies above and across bar 5 and is guided in vertically slotted plates $4^h$ and $4^i$ attached to base plate $4^a$ within the casing. This catch plate 7 is connected to the upper end of a vertically movable rod $7^a$, which extends into the vessel as shown, and the lower end of rod $7^a$ is loosely connected with one end of a lever $7^b$, which is pivoted at $7^c$ on the bottom of and within the vessel; and the free end $7^d$ of said lever is normally raised when the rod $7^a$ is depressed or in its lowermost position at which time the plate 7 rests upon the top of the bar 5, and when bar 5 is retracted the plate 7 drops into notch $5^t$ and locks the bar, as shown in Figs. 1 and 5, thus freeing the outlet valve 3 but closing and locking the inlet valve $2^a$ before the valve 3 is entirely released. The locking plate 7 when engaged with the bar 5 prevents the latter being moved outward again by manipulation of the lever 6.

After each filling of the vessel, (say one gallon for each filling thereof), the float F descends as the liquid is withdrawn, in greater or less quantities, through the outlet valve, and just before the last of the liquid is withdrawn the float F engages the arm $7^d$ of the lever $7^b$ and depresses the latter, thereby raising rod $7^a$ and catch 7; and the parts are so proportioned and arranged that at the instant the full quantity of liquid is withdrawn from the vessel through the outlet valve 3, the catch 7 will be disengaged wholly from the bar 5. The bar 5 can then be projected by pulling the lever 6 forward, as described, provided the outlet valve 3 be first closed so as to bring one of the notches $3^d$ into register with the end $5^a$ of bar 5.

As soon as the liquid is introduced into the vessel and the float begins to rise, the rod $7^a$ and catch plate 7 drop by gravity until the catch 7 rests upon the top of the bar and lies there ready to engage notch $5^t$ the instant the bar 5 is retracted by the spring $5^e$. The bar 5 may be kept from lateral oscillation by any suitable means; for instance a pin $5^u$ engaging a slot $4^u$ in the guide $4^e$, as shown in Figs. 4 and 5.

From the foregoing it will be seen that before the inlet valve can be opened the outlet valve must be closed and locked and that it will remain so closed and locked until the proper amount of fluid has been admitted into the vessel and the float F rises sufficiently to disengage the detent $6^n$ from bar 5; that thereupon spring $5^e$ will retract bar 5; and said bar is so proportioned that it will close the inlet valve $2^a$ before it unlocks the outlet valve, and therefore the inlet valve must be closed and will be locked closed before the outlet valve can be opened and while said valve is opened; therefore no liquid can be run through the vessel by reason of both valves being open at the same time. Furthermore it will be seen that by means of the controlling devices above described when the vessel is once filled and the float has caused the release of the detent $6^n$ from the locking bar 5 that the inlet valve will be closed, and that it cannot be again opened until the liquid has been withdrawn from the vessel and the float descends and causes lever $7^d$ to raise rod $7^a$ and lift the catch 7 out of engagement with the locking bar 5. Therefore after the proper amount of liquid has been introduced into the vessel no more liquid can be introduced thereinto, until the same quantity of liquid has been withdrawn from the vessel, and while the vessel is being filled no liquid can be withdrawn therefrom.

Assuming that the vessel has a capacity of one gallon for each charge; the amount of liquid passed therethrough can be easily determined by registering the number of full reciprocations given the locking bar 5. In order to register the amount of liquid passed through the vessel, or the number of times that the vessel has been filled, I provide bar 5 with a finger $5^v$ to which is attached a pin $5^w$ that engages a slot $9^a$ in a lever 9 attached to the shaft $9^b$ of a rotary registering mechanism, indicated at $9^c$, which may be of any suitable construction; whereby for each reciprocation of the bar 5 the rock shaft $9^b$ will be actuated and cause the desired number of units to be registered on the units wheel of the registering mechanism. The dog $6^x$ and ratchet $6^z$ insure that the lever 6 must move the bar 5 sufficiently forward to effect registration before the lever or bar can be retracted, and they also prevent repeated or improper oscillations of the lever.

The valve controlling parts of the mechanism are inclosed in casing 4 so that they cannot be tampered with; the lever 6 can project through a slot in the top of the casing as shown in Fig. 1.

The above described measuring and registering apparatus may be connected to a keg or barrel as described in my aforesaid application so that such connection cannot be disturbed except by breaking or injuring the apparatus; thus preventing surreptitious withdrawal of liquid from such container while connected to the measuring vessel.

The apparatus embodying the present invention posses all the advantages and utilities of the apparatus shown in my aforesaid application, and at the same time is neater in appearance, more compact, more economical in construction, more durable, and more efficient in operation.

What I claim is:

1. In combination, a measuring vessel having an outlet valve, a valve stem therefor, a notched member on the valve stem, a reciprocating member adapted to engage the notched member and lock the valve in closed position, means for locking said reciprocating member in projected and retracted positions, a float in the vessel, and devices operated by said float for releasing said locking means.

2. In combination, a measuring vessel having an outlet valve, a valve stem, a notched member on said stem, a reciprocating member adapted to engage said notched member to lock the valve in closed position, and means for locking said reciprocating member in projected and retracted positions; with a float in the vessel, and devices operated by said float for releasing said locking means.

3. In combination, a vessel having an inlet valve and an outlet valve, devices for manually operating the outlet valve, a reciprocating member adapted to operate the inlet valve and to lock and unlock the outlet valve operating devices, means for locking said reciprocating member in projected position, and means for locking said reciprocating member in retracted position, substantially as described.

4. In combination, a vessel having an inlet valve and an outlet valve, devices for manually operating the outlet valve, a reciprocating member adapted to operate the inlet valve and to lock and unlock the outlet valve operating devices, means for locking said reciprocating member in projected position, and means for locking said reciprocating member in retracted position; a float in the vessel, and devices operated by said float for disengaging said locking means from said reciprocating member.

5. In combination, a vessel, inlet and outlet valves therefor, devices for manually operating the outlet valve, a reciprocating member adapted to open the inlet valve and lock the outlet valve, operating devices, and means for reciprocating said member; with means for locking said member in one position, means for locking the member in its other position, and a float in the vessel adapted to alternately release said member locking means.

6. In combination, a vessel having inlet and outlet valves, devices for manually operating the outlet valve, a reciprocating bar adapted to open the inlet valve and lock the outlet valve operating devices, a lever for projecting said bar in one direction, and a spring for moving the bar in the opposite direction; with means for locking said bar in projected position, and means for locking the bar in retracted position.

7. In combination, a measuring vessel having an inlet valve and an outlet valve; means for manually operating the outlet valve, a reciprocating bar, connections between said bar and inlet valve for opening and closing the latter, and means whereby said bar in moving to one position locks the outlet valve operating devices and afterward opens the inlet valve, and in moving to another position closes and locks the inlet valve and then frees the outlet valve; with a lever for moving said bar in one direction, a spring for moving the bar in the opposite direction; means adapted to engage the bar and lock it in projected position; means adapted to engage said bar and lock it in retracted position; and a float in the vessel adapted to release said bar locking means alternately, substantially as described.

8. In combination, a measuring vessel having an inlet valve and an outlet valve; a reciprocating bar and connections between said bar and inlet valve for opening and closing the latter, and means whereby said bar when projected locks the outlet valve and opens the inlet valve, and when retracted locks the inlet valve and frees the outlet valve; a lever adapted to project the bar, a spring for retracting the bar, a detent adapted to engage the bar and lock it in projected position; a catch adapted to engage said bar and lock it in retracted position; and a float in the vessel adapted to release the detent and catch alternately.

9. In combination, a measuring vessel having an inlet valve and an outlet valve; a reciprocating bar, connections between said bar and inlet valve for opening and closing the latter, and means whereby said bar when projected locks the outlet valve and opens the inlet valve, and when retracted locks the inlet valve and frees the outlet valve; a pivoted lever beside said bar, a pawl on said lever adapted to engage said bar and move it in one direction, a spring for returning the bar in the opposite direction; a detent adapted to engage the bar and lock it in projected position, a catch adapted to engage said bar and lock it in retracted position, detent and catch tripping devices extending into the vessel, and a float in the vessel movable between said devices and adapted to operate them alternately, substantially as described.

10. In combination, a measuring vessel, a valve, a notched disk attached to the valve, a reciprocating bar adapted to engage said notched disk to lock the valve in closed position, means for reciprocating said bar, and means for locking the bar, substantially as described.

11. In combination, a measuring vessel having an inlet valve and an outlet valve, a notched disk attached to the outlet valve, a reciprocating member adapted to be engaged with said notched disk to lock the valve in closed position, connections between said reciprocating member and the inlet valve whereby when the latter is opened the outlet valve is closed, and vice versa; and devices for locking the bar in its extreme positions; with a float in the vessel, and means controlled by said float for releasing the said bar locking devices.

12. In combination, a measuring vessel, a valve, a notched disk attached to the valve, a reciprocating bar adapted to engage said notched disk to lock the valve in closed position, means for reciprocating said bar, and means for locking the bar; with a float in the vessel, and means controlled by said float for releasing the bar locking device, substantially as described.

13. In combination with a measuring vessel having an inlet valve and an outlet valve, a longitudinally movable bar adapted in one position to lock the outlet valve, and connections between said bar and the inlet valve whereby after the outlet valve is locked the inlet valve may be opened, and vice versa; with devices for locking said bar in either extreme position; a float within the vessel, and devices actuated thereby for disengaging the bar locking devices at the proper time.

14. In combination with a measuring vessel having an inlet valve and an outlet valve, a longitudinally movable bar adapted in one position to lock the outlet valve, and connections between said bar and the inlet valve whereby when the outlet valve is locked the inlet valve is opened, and vice versa; a lever pivoted beside the bar, a pawl on said lever adapted to engage the bar and move it to lock the outlet valve, a spring for retracting said bar to release the outlet valve and close the inlet valve; a device adapted to engage the bar and hold it in outlet valve locking position; a device adapted to engage the bar and hold it in inlet valve closing position; members adapted to engage the said devices, said members projecting into the vessel; and a float in the vessel adapted to alternately engage said members to release the devices alternately.

15. In combination, a measuring vessel, means for supplying matter to the vessel and means for withdrawing matter therefrom; a supply valve, an outlet valve; a reciprocatory bar exterior to the vessel adapted to lock the outlet valve before the supply valve can be opened, and to lock the supply valve before the outlet valve can be opened; means for locking the bar in protracted position, and means for locking the bar in retracted position; with a float in the vessel, and devices actuated alternately by the float controlling the said bar locking means, substantially as described.

16. In a dispensing apparatus, the combination of a vessel, an inlet valve controlling the admission of matter into the vessel, an outlet valve controlling the withdrawal of matter therefrom, a reciprocating bar exterior to the vessel whereby the inlet valve is locked when the vessel is filled, and remains locked until the vessel is emptied; and whereby the outlet valve is locked closed before the inlet valve is opened and held locked until the vessel is filled and the supply valve closed; means for locking the bar in protracted position, and means for locking the bar in retracted position; with a float in the vessel and devices actuated alternately by said float controlling the said bar locking means.

17. In combination, a vessel, inlet and outlet valves therefor, devices for manually operating the outlet valve, a reciprocating member adapted to open the inlet valve and lock the outlet valve operating devices and means for reciprocating said member, a catch for locking said member in one position, a pivoted detent for locking the member in its other position, and a float in the vessel, and means operated by the float to alternately release said catch and said detent.

18. In combination, a vessel having inlet and outlet valves, devices for manually operating the outlet valve, a reciprocating bar adapted to open the inlet valve and lock the outlet valve operating devices, a lever for projecting said bar in one direction, and a spring for moving the bar in the opposite direction; with a pivoted detent for locking said bar in projected position, and a catch for locking the bar in retracted position.

19. In combination, a measuring vessel having an inlet valve and an outlet valve, means for manually operating the outlet valve, a reciprocating bar, connections between said bar and inlet valve for opening and closing the latter, and means whereby said bar in moving to one position locks the outlet valve operating devices and afterward opens the inlet valve, and in moving to another position closes and locks the inlet valve and then frees the outlet valve; with a lever for moving said bar in one direction, a spring for moving the bar in the opposite direction; a pivoted toothed detent adapted to engage the bar and lock it in projected position; a catch adapted to engage said bar and lock it in retracted position; a float in the vessel and devices operated by said float alternately to release said catch and said detent, substantially as described.

20. In combination with a measuring vessel having an inlet valve and an outlet valve, a longitudinally movable locking bar adapted in one position to lock the outlet valve, and connections between said bar and the inlet valve whereby when the outlet valve is locked the inlet valve is opened, and vice versa; a detent adapted to lock the bar in one position; a catch adapted to lock the bar in its other position; devices for disengaging said detent and catch projecting into said vessel, a float in the vessel and devices operated by said float adapted to alternately cause said catch and said detent to release said bar, a spring for retracting said bar, and manually operable means for projecting said bar.

In testimony that I claim the foregoing as my own, I affix my signature in presence of two witnesses.

CHARLES F. BROWN.

Witnesses:
 Jos. Isaacs,
 John J. Wiley.

Copies of this patent may be obtained for five cents each, by addressing the "Commissioner of Patents, Washington, D. C."